July 24, 1956 W. A. RINGLER 2,755,964
COLLAPSIBLE BOTTLE CARRIERS
Filed July 22, 1952 9 Sheets-Sheet 1

INVENTOR.
WILLIAM A. RINGLER
BY Reuben J. Carlson
ATTORNEY

July 24, 1956 W. A. RINGLER 2,755,964
COLLAPSIBLE BOTTLE CARRIERS
Filed July 22, 1952 9 Sheets-Sheet 3

INVENTOR.
WILLIAM A. RINGLER
BY
Reuben J. Carlson
ATTORNEY.

July 24, 1956  W. A. RINGLER  2,755,964
COLLAPSIBLE BOTTLE CARRIERS
Filed July 22, 1952  9 Sheets-Sheet 9

INVENTOR.
WILLIAM A. RINGLER
BY
Reuben J. Carlson
ATTORNEY.

United States Patent Office 2,755,964
Patented July 24, 1956

2,755,964
COLLAPSIBLE BOTTLE CARRIERS

William A. Ringler, Wayne, Pa., assignor to The Gardner Board & Carton Co., Middletown, Ohio, a corporation of Ohio Application July 22, 1952, Serial No. 300,207

3 Claims. (Cl. 220—118)

This invention relates to collapsible bottle carriers, and more particularly to twin compartmented multi-cell bottle carriers formed from paperboard or fiberboard material which are designed to permit flat collapse thereof during shipment and storage and convenient erection for bottle filling and transportation.

Consumer demand for bottled soft drinks and other beverages has made it desirable and necessary for the beverage bottling and distributing industry to provide bottle carriers by means of which the consumer may conveniently receive and transport a plurality of beverage filled bottles and conveniently return the empty bottles. Beverage bottlers and distributors have also found it increasingly desirable to install systematized equipment for filling the carriers, placing the filled carriers in low wall distributor cases, stacking and transporting the carrier filled distribution cases and removing the empty bottles from the returned carriers for washing and cleansing. To meet these manifold requirements, bottle carriers accordingly must be strong and sturdy in construction to permit repeated use thereof, attractive and appealing in appearance, and designed to permit convenient erection, bottle filling and stacking thereof and convenient collapse for shipment and storage.

Carriers made in accordance with this invention are each formed from a carton body forming blank and a handle forming blank. The handle forming blank is captured from otherwise waste material removed from between the wing extensions of the body forming blank and is designed to be conveniently attached to the assembled carton body to provide a strong and sturdy handle part therefor. The paperboard or fiberboard stock sheets from which the body blanks and handle blanks are cut, need be finished and imprinted on one side thereof only. The paired body and handle forming blanks are so designed as to permit simultaneous scoring and cutting thereof from selected stock sheets in a single pass through a cutting and scoring machine and with little resultant waste of stock sheet material.

These carton body forming blanks are so scored and cut as to permit high speed gluing and folding thereof with a minimum number of operations in a single pass through a gluing and folding machine of substantially standard construction to provide a fully assembled carrier in collapsed form. The companion handle forming blank, recovered from removed material between the wing extensions of the carton forming blank, is designed to provide two hingedly connected handle forming sections adapted for convenient securement by a high speed machine operation to the double-ply center partition of the assembled carrier body, and to thereby provide a strong and sturdy handle part of plural-ply construction.

The side and end wall panels of these carriers as erected extend from the flat bottom panel to any desired height, and present substantially flat surface areas for the reception of attractive advertising decoration, with the bottles therein adequately displayed. The composite multi-ply center partition is centrally spaced between the side panels to provide a strong and sturdy backbone structure for the carrier, and the paired end panel sections are foldably connected to the vertical side edges of the adjacent side panels and the center partition in a manner to permit convenient erection and collapse of the carrier. Cross partition forming straps extend between and are foldably connected to each side panel and center partition to provide bottle retaining cells for each of the two carrier compartments. The bottom panel is longitudinally scored in alignment with the center partition to define similar paired bottom sections which permit flat collapse of the carrier.

These carriers are designed and constructed to permit low cost manufacture and assembly thereof, are durable and lasting in use, attractive in appearance, convenient for consumer handling, rigid and sturdy when erected, and provide cushion protection and retainment of the bottles inserted therein. Containers constructed in accordance with this invention may be designed to contain four, six, twelve or any desired number of bottles as may be required.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which—

Similar reference characters refer to similar parts throughout the several views of the drawings and specification.

The bottle carriers of this invention are assembled from a carton forming blank A and an associated handle forming blank B which are so shaped and formed that a successive series of paired carton and handle blanks may be fully cut and scored from a sheet or roll of paperboard or fiberboard in a single pass operation through an automatic cutting and scoring machine with substantially no waste resulting. The stock sheet from which the blanks are cut may comprise virgin kraft stock or coated or lined wastepaper stock of suitable thickness and strength. The carrier forming blanks are so cut and scored that the stock sheets need be printed and decorated on one face thereof only, and when assembled as finished carriers, the printing and decoration will all appear on the outside faces thereof.

Figure 1:
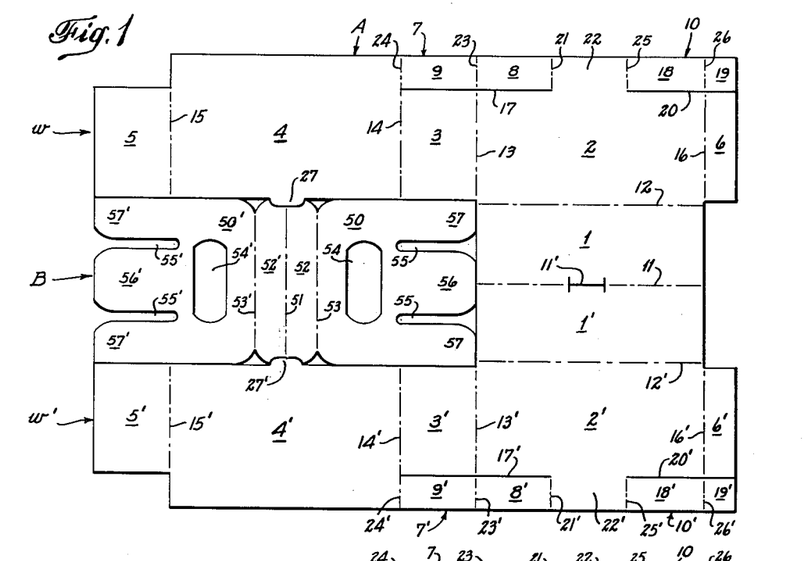
Fig. 1 is an inside face view of a six cell carton body forming blank and associated handle forming blank as they would appear when cut and scored from a paperboard or fiberboard stock sheet.
Figures 2, 3:
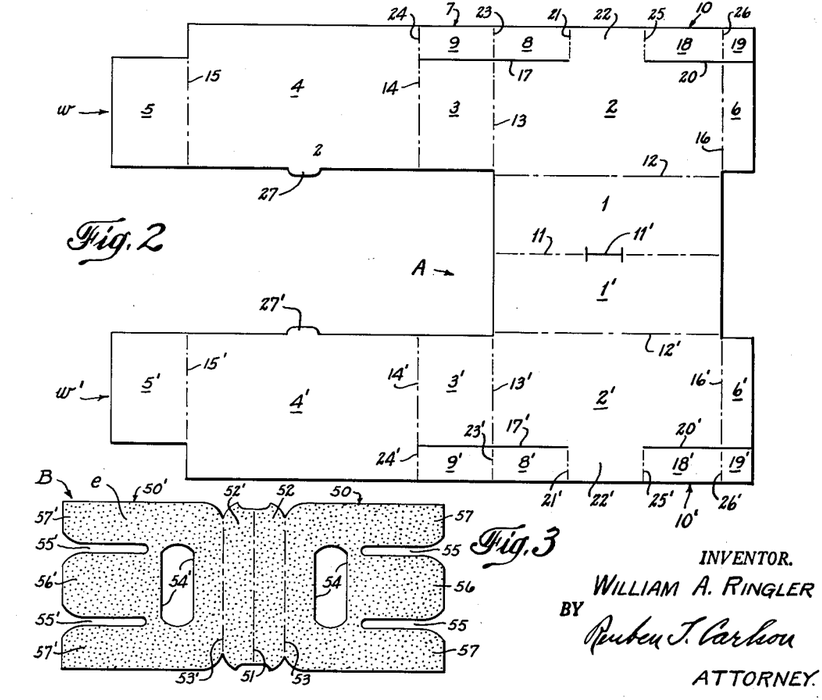
Fig. 2 is an inside face view of the carton body forming blank.
Fig. 3 is a plan view of the handle forming blank having a coating of adhesive applied to the inside face thereof.
Figure 10:
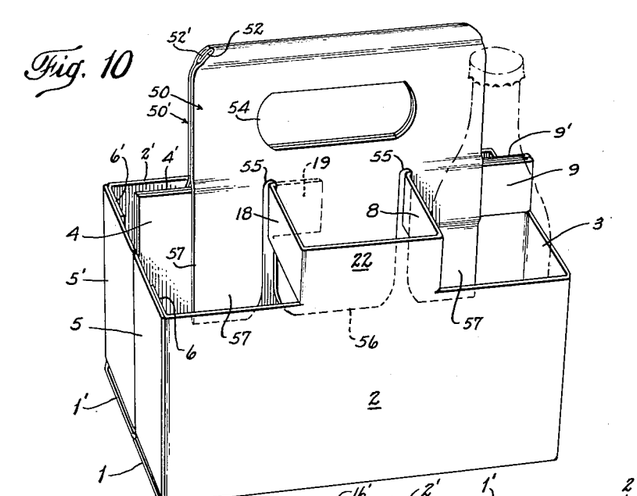
Fig. 10 is a perspective view of the fully assembled bottle carrier set up to receive bottles in the cells thereof.

The carton forming blank A and its associated handle forming blank B as shown in Fig. 1 are produced from a substantially rectangular stock sheet section to form a carrier designed to contain six bottles as shown in Fig. 10. The bottom panel comprises bottom half sections 1 and 1' of similar size, hingedly connected along a longitudinally extending collapsing score 11. Side panels 2 and 2' are hingedly connected to the opposite side edges of the bottom sections 1 and 1' along parallel extending scores 12 and 12' which are also parallel to the bottom collapsing score 11. Wings w and w' extend from adjacent side edges of the side panels 2 and 2' as shown in Figs. 1 and 2 to form a carton forming blank which is generally U-shaped in configuration.

The wings w and w' of the blank are scored to form a pair of end wall panel sections 3 and 3' foldably connected along score lines 13 and 13' to the adjacent side edges of the side panels 2 and 2' respectively. A pair of center partition sections 4 and 4' are foldably connected along score lines 14 and 14' to the respective end panels 3 and 3'. A pair of end wall panel sections 5 and 5' are foldably connected along score lines 15 and 15' to the adjacent side edges of the center partition sections 4 and 4'. A pair of glue flap sections 6 and 6' are foldably connected along score lines 16 and 16' to the opposite side edges of the side wall panels 2 and 2'.

A pair of strap forming parts 7 and 7' are separated from the side panels 2 and 2' and the adjacent end panel sections 3 and 3' by a pair of longitudinally extending cuts 17 and 17'. The strap forming parts 7 and 7' as shown in Figs. 1 and 2 are foldably connected at one end thereof by transverse scores 21 and 21' to raised extensions 22 and 22' of the side panels 2 and 2'. The other end of the strap parts 7 and 7' are foldably connected to the upper part of the adjacent center partition sections 4 and 4' along hinging scores 24 and 24' forming continuations of the end panel defining scores 14 and 14'. The strap forming parts 7 and 7' are also traversed by medial scores 23 and 23' which are substantially in alignment with the transverse scores 13 and 13' as the blanks shown in Figs. 1 and 2 are formed. The medial scores 23 and 23' thus divide the strap forming parts 7 and 7' into two foldable sections comprising cross partition forming sections 8 and 8' and spanner sections 9 and 9'.

A pair of strap forming parts 10 and 10' are separated from the side panels 2 and 2' and the adjacent securing flaps 6 and 6' by a pair of longitudinally extending cuts 20 and 20'. The strap forming parts 10 and 10' as shown in Figs. 1 and 2 are foldably connected at one end thereof by transverse scores 25 and 25' to the medial extensions 22 and 22' of the side panels 2 and 2'. The strap forming parts 10 and 10' are traversed by medial scores 26 and 26' which are substantially in alignment with the transverse scores 16 and 16' which hinge the securing flaps 6 and 6' to the side panels. The medial scores 26 and 26' thus divide the strap forming parts 10 and 10' into two foldable sections comprising cross partition forming sections 18 and 18' and spanner tabs 19 and 19'. The carton forming blank as shown in Figs. 1 and 2 may also be provided with lock tabs 27 and 27' projecting from the lower edges of the center partition sections 4 and 4' and designed for insertion into a conforming slot 11' formed in the center portion of the bottom collapsing score 11.

Figure 4:
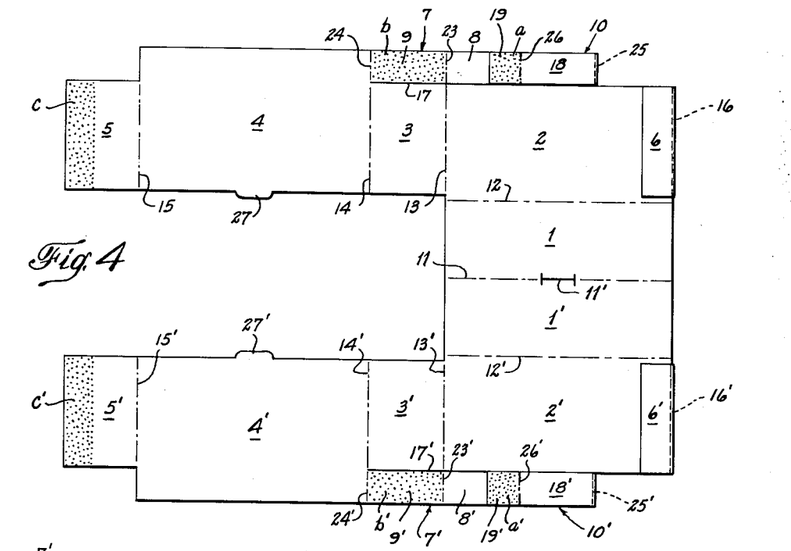
Fig. 4 is a plan view of the carton body forming blank as the same would appear after the first folding and gluing operation.

After cutting and scoring of the carton forming blank A and the associated handle forming blank B as shown in Fig. 1, the handle forming blank B drops from between the wings *w* and *w'* leaving the carton forming blank in the form shown in Fig. 2, and in condition for gluing and folding into a collapsed carton body. In assembling the carton body, the strap parts 10 are first folded along the transverse scores 25 and 25' so as to overlie the medial extensions 22 and 22' of the side panels 2 and 2' as shown in Fig. 4. Thereupon, spots *a* and *a'* of adhesive are applied to the spanner tabs 19 and 19' of the folded strap parts 10 and 10', spots *b* and *b'* of adhesive are applied to the spanner sections 9 and 9', and strips *c* and *c'* of adhesive are applied to either the outer margins of the end panel sections 5 and 5' or to the previously folded securing flaps 6 and 6'.

Figure 5:
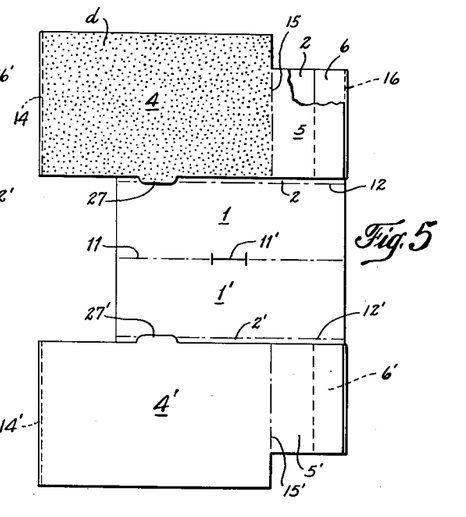
Fig. 5 is a plan view of the carton body forming blank as it would appear after the second folding and gluing operation has been performed on the blank shown in Fig. 4.

In the second folding operation, the glued blank as shown in Fig. 4 is folded along the transverse scores 14 and 14' so as to place the center partition sections 4 and 4' in overlying relation to the adjacent end panel sections 3 and 3' and place the end panel sections 5 and 5' in overlying relation to the adjacent side wall panels 2 and 2', with the marginal edges of the end panel sections 5 and 5' overlying the securing flaps 6 and 6' as shown in Fig. 5. Upon application of rolling pressure to the thus folded blank, the spanner sections 9 and 9' become adhesively secured to the adjacent inside faces of the center partition section 5 and 5', the spanner tabs 19 and 19' will also become adhesively secured to the inside face of the adjacent center partition sections 4 and 4', and the end panel sections 5 and 5' will become adhesively secured to the securing flaps 6 and 6', thereby producing a partly folded blank as illustrated in Fig. 5.

Figure 6:
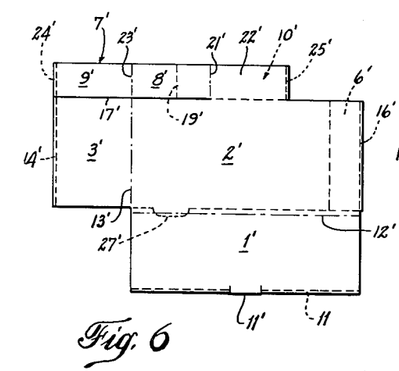
Fig. 6 is a plan view of the collapsed carton body as it would appear after the third folding operation has been executed on the partially folded blank shown in Fig. 5.
Figure 9:
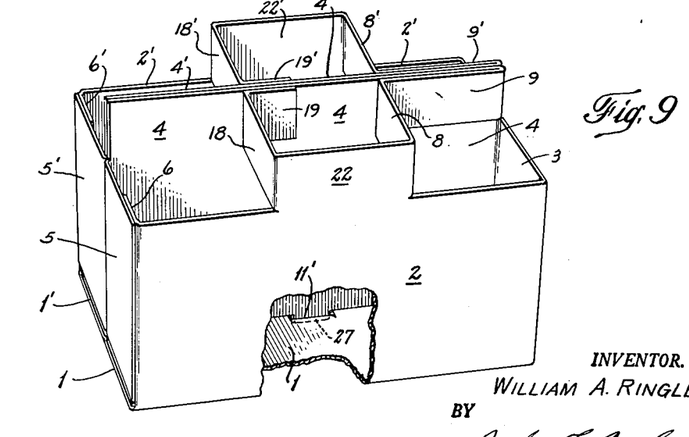
Fig. 9 is a perspective view of the fully expanded and erected carton body ready for application of the handle part as shown in Fig. 8, certain parts being broken away to illustrate certain features of the locking means which may be emyployed to maintain the carton body in fully expanded condition.

A coating *d* of adhesive is then applied to the outside face of the overlying center partition section 4 as indicated in Fig. 5, and thereupon the blank is folded along its bottom collapsing score 11 to place the center partition section 4' in overlying and adhesively secured relation to center partition section 4, with the end panel section 5' overlying but unsecured to the end panel section 5. The carton body will then be fully assembled in collapsed form and will appear as shown in Fig. 6. The collapsed carton body may then be erected by pressing the bottom collapsing score 11 against a flat surface which will cause the body to automatically expand in the manner shown in Fig. 7. Upon insertion of the lock tabs 27 and 27' into the conforming slot 11' formed in the bottom collapsing score as shown in Fig. 9, the carton body will be maintained in fully expanded and erected condition.

The associated handle forming part B, recovered from material between the wings *w* and *w'* of the body blank, is cut and scored simultaneously with the cutting and scoring of the body forming blank A to provide a pair of handle forming sections 50 and 50' which are hingedly connected along a transverse score 51 as shown in Figs. 1 and 3. The handle sections 50 and 50' preferably incorporate rebent portions 52 and 52' defined by parallel transverse scores 53 and 53'. The handle sections 50 and 50' are also provided with hand hole cut outs 54 and 54' and a pair of open end slots 55 and 55' which define a center leg 56 and 56' and a pair of spaced end legs 57 and 57'. The center legs 56 and 56' are designed to be inserted between the adjacent cross partition strap sections 8 and 18, 8' and 18' of the erected carton body, with the end legs 57 and 57' positioned exterior of the cross partition strap sections 8 and 18, 8' and 18', respectively.

In applying the handle forming blank B to the assembled carton body, a coating *e* of adhesive is applied to the inside face of the handle part as shown in Fig. 3. The rebent portions 52 and 52' of the handle sections 50 and 50' are then folded along the medial score 51 with the glued faces thereof outermost. The handle sections 50 and 50' are then reverse folded along the parallel scores 53 and 53' so that the glued face of the rebent portion 52 will be secured to the glued face of its associated handle section 50, and the glued face of the rebent portion 52' will be adhesively secured to the glued face of its associated handle section 50'.

Figure 7:
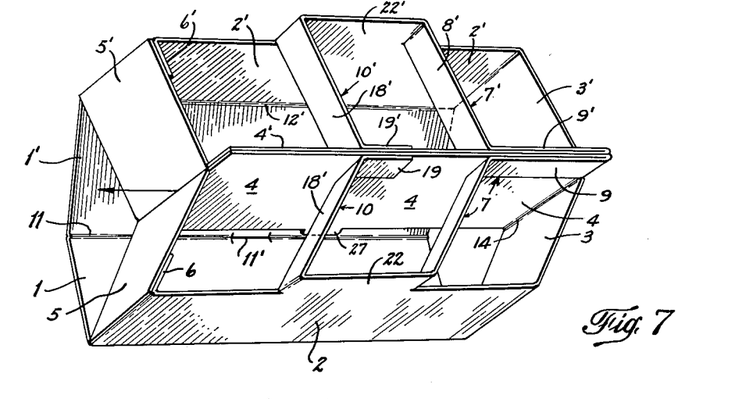
Fig. 7 is a perspective view of the carton body after it has been partially expanded from its collapsed condition shown in Fig. 6.
Figure 8:
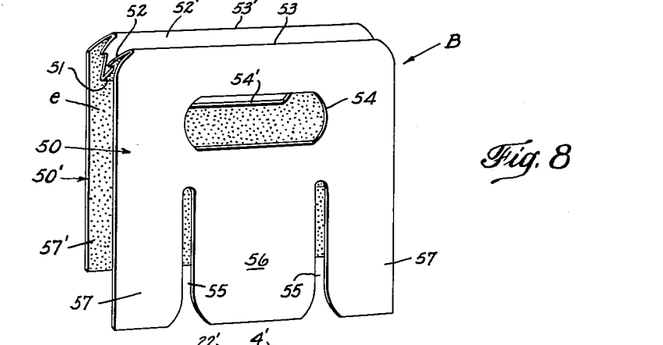
Fig. 8 is a perspective view of the glued handle blank as shown in Fig. 3 after it has been folded in condition for application to the expanded carton body.

The handle part is then telescope over the composite center partition of the carton body with the center leg 56 positioned between the cross partition strap sections 8 and 18 and secured to the adjacent face of the cross partition section 4, with the end legs 57 exterior to the adjacent cross partition strap sections 8 and 18 and also secured to the adjacent face of the center partition section 4. Similarly, the center leg 56' of the handle part is inserted between the cross partition strap sections 8' and 18' and secured to the adjacent face of the center partition section 4', with the end legs 57' of the handle part exterior to the cross partition strap sections 8' and 18' and secured to the adjacent face of the center partition section 4'. The handle part B may be mechanically secured to the center partition of the carton body in the manner above indicated and shown in Figs. 10 and 11, either while the carton body is only partly expanded as indicated in Fig. 7 or when fully expanded as indicated in Fig. 9.

Figures 11, 12, 13:
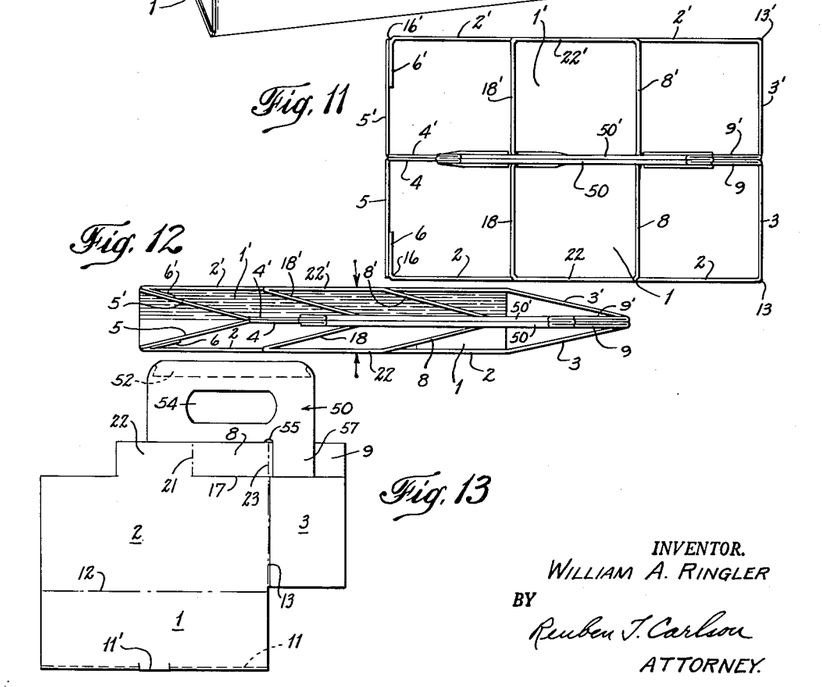
Fig. 11 is a top plan view of the fully erected bottle carrier shown in Fig. 10.
Fig. 12 is a top plan view of the bottle carrier shown in Figs. 10 and 11 as it would appear when partially collapsed.
Fig. 13 is a side view of the bottle carrier as it appears when fully collapsed in condition for shipment or storage.

As thus secured, the handle part B remains fixed at all times to the center partition of the carton body to provide a strong and sturdy bottle carrier which can thereafter be readily collapsed into flat form for shipment or storage as shown in Figs. 12 and 13. This carrier may also be readily erected by pressing the bottom collapsing score 11 against a flat surface and inserting the paired lock tabs 27 and 27' into the conforming slot 11' in the bottom panel. A highly serviceable twin compartment carrier for six bottles is thus provided.

Figure 14:
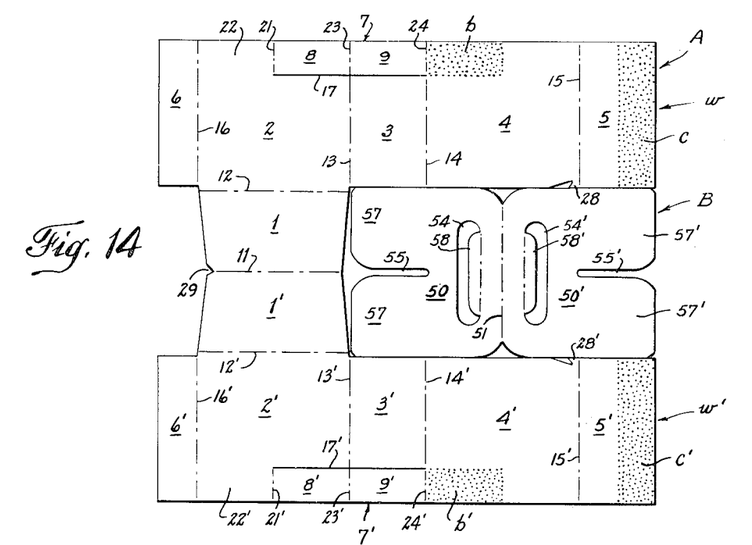
Fig. 14 is an inside face view of a modified carton forming blank and associated handle forming blank as cut and scored from a paperboard or fiberboard stock sheet, this view also showing adhesive applied to certain parts of the body forming blank prior to the initial folding operation thereof.

The carton forming blank A and its associated handle forming blank B as shown in Fig. 14 are designed when assembled to provide a carrier with four bottles receiving cells and are both cut from a substantially rectangular stock sheet section with very little waste in cutting. The carrier forming blank A as shown in Fig. 14 has a bottom panel sized to support four bottles and comprises bottom half sections 1 and 1' hingedly connected along a longitudinally extending collapsing score 11. The side panels 2 and 2' are hingedly connected to the opposite side edges of the bottom sections 1 and 1' along parallel extending scores 12 and 12' which are also parallel to the bottom collapsing score 11. Wings *w* and *w'* extend from adjacent side edges of the side panels 2 and 2' to provide a carton forming blank which is generally U-shaped in configuration.

The wings *w* and *w'* of the carton blank are scored to form a pair of end wall panel sections 3 and 3' foldably connected along score lines 13 and 13' to the adjacent side edges of the side panels 2 and 2' respectively. A pair of center partition sections 4 and 4' are foldably connected along score lines 14 and 14' to the respective end panels 3 and 3'. A pair of end wall panel sections 5 and 5' are foldably connected along score lines 15 and 15' to the adjacent side edges of the center partition sections 4 and 4'. A pair of glue flap sections 6 and 6' are foldably connected along score lines 16 and 16' to the opposite side edges of the side wall panels 2 and 2'. The side wall panels 2 and 2' and the center partition sections 4 and 4' each has a length which approximately corresponds to the diameter of two bottles, so that the carton body as formed from this blank provides a twin compartment carrier with two bottle cells in each compartment.

A pair of strap forming parts 7 and 7' are separated from the side panels 2 and 2' and the adjacent end panel sections 3 and 3' by a pair of longitudinally extending cuts 17 and 17'. The strap forming parts 7 and 7' as shown in Fig. 14 are foldably connected at one end thereof by transverse scores 21 and 21' to raised extensions 22 and 22' of the side panels 2 and 2'. The other ends of the strap parts 7 and 7' are foldably connected to the upper part of the adjacent center partition sections 4 and 4' along hinging scores 24 and 24' forming continuations of the end panel defining scores 14 and 14'. The strap forming parts 7 and 7' are also traversed by medial scores 23 and 23' which are substantially in alignment with the transverse scores 13 and 13' as the carton blank shown in Fig. 14 is formed. The medial scores 23 and 23' thus divide the strap forming part 7 and 7' into two foldable sections comprising cross partition forming sections 8 and 8' and spanner sections 9 and 9'. The carton forming blank as shown in Fig. 14 may also be provided with hook portions 28 and 28' formed in the lower edges of the center partition sections 4 and 4' adjacent the transverse scores 15 and 15'. The hook portions 28 and 28' are designed to engage in a notch 29 formed in the corresponding terminal end of the bottom collapsing score 11 when the carton body is assembled.

After cutting and scoring the rectangular stock sheet in the manner shown in Fig. 14, the handle forming blank B drops from between the wing w and w' leaving the body forming blank A in condition for gluing and folding into a collapsed carton body. In the initial gluing operation, spots b and b' of adhesive are applied to the spanner sections 9 and 9' or over the adjacent corresponding areas of the center partition sections 4 and 4'. Strips c and c' of adhesive are also applied to the outer margins of the end panel sections 5 and 5'.

Figure 15:
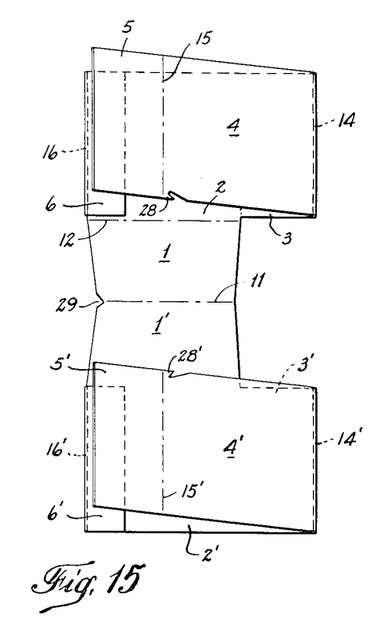
Fig. 15 is a perspective view of the carton forming blank shown in Fig. 14 as it would appear when undergoing the initial folding operation.

In the first folding operation as shown in Fig. 15, the securing flaps 6 and 6' are bent inwardly along their hinging scores 16 and 16' so as to overlie the inside face of the adjacent side wall panels 2 and 2'. In substantially the same folding operation, the glued blank is folded along the transverse scores 14 and 14' so as to place the center partition sections 4 and 4' in overlying relation to the adjacent end panel sections 3 and 3' and to place the end panel sections 5 and 5' in overlying relation to the adjacent side wall panels 2 and 2', with the glued marginal edges of the end panel sections 5 and 5' overlapping the inturned securing flaps 6 and 6'. Upon application of rolling pressure to the thus folded blank, the spanner sections 9 and 9' become adhesively secured to the adjacent inside faces of the center partition sections 4 and 4', and the end panel sections 5 and 5' will become adhesively secured to the securing flaps 6 and 6', thereby producing the folded body blank as illustrated in Fig. 16.

Figure 16:
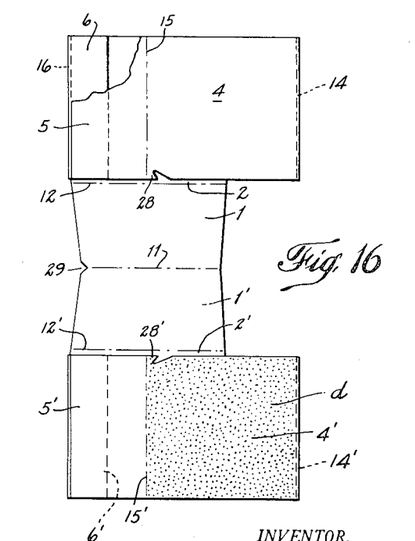
Fig. 16 is a plan view of the carton forming blank after the initial folding operation shown in Fig. 15 has been completed, this view also showing adhesive applied to one of the center partition sections thereof in preparation for the next folding operation.
Figures 17, 18, 19, 20, 21, 22, 22A:
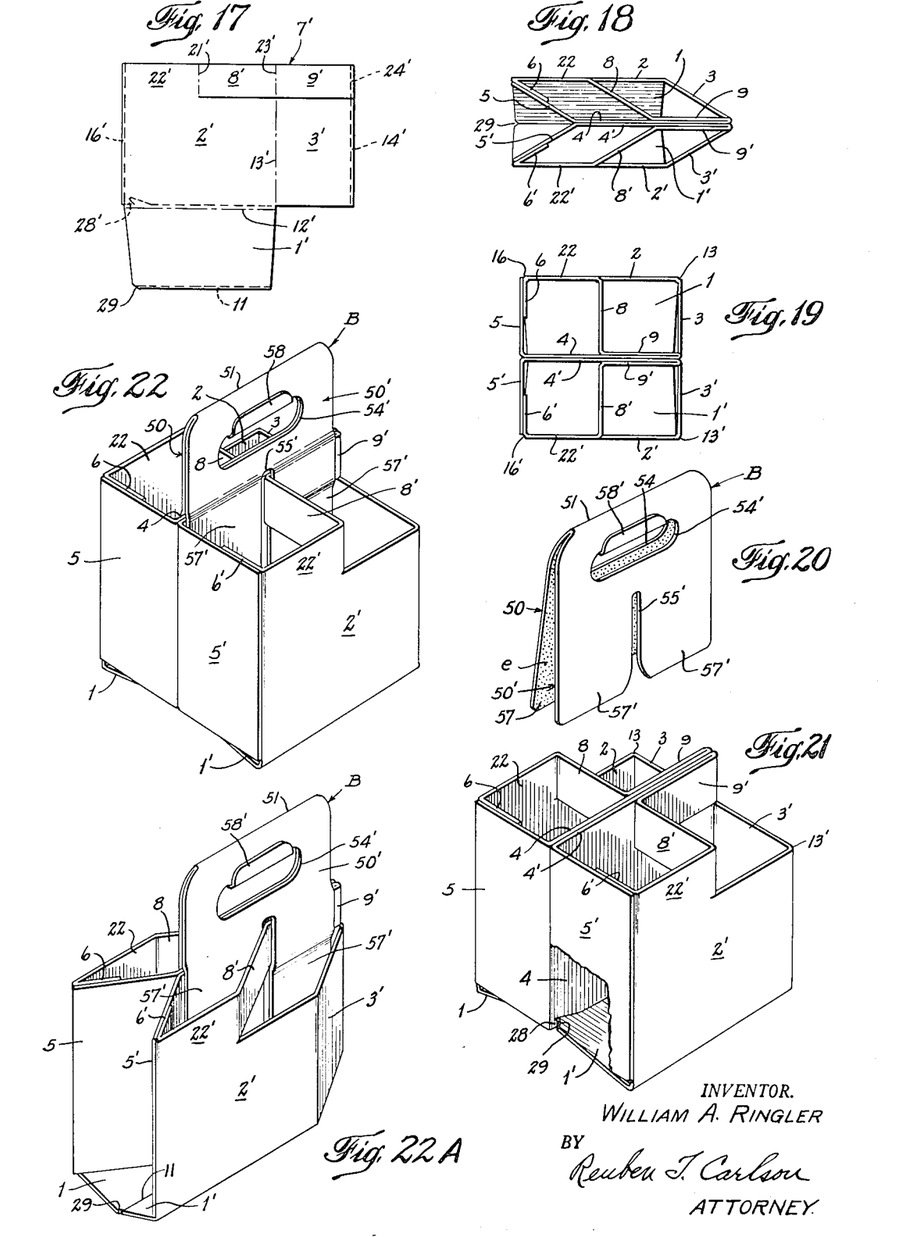
Fig. 17 is a plan view of the body forming carton fully assembled in collapsed form as produced by the second folding operation executed on the blank shown in Fig. 16.
Fig. 18 is a top plan view of the carton body shown in Fig. 17 as it would appear when undergoing erection expansion.
Fig. 19 is a top plan view of the fully erected carton body.
Fig. 20 is a perspective view of the handle forming blank after gluing and folding in condition for telescoping application to the erected carton body.
Fig. 21 is a perspective view of the fully erected carton body prior to application of the handle part thereto.
Fig. 22 is a perspective view of the fully assembled carrier designed to receive four bottles and made from the body forming blank and associated handle forming blank shown in Fig. 14.
Fig. 22a is a perspective view of the four bottle carrier shown in Fig. 22 as it would appear when partially collapsed.

A coating d of adhesive is then applied to the outside face of either one of the center partition sections 4 or 4' as indicated in Fig. 16, and thereupon the blank is folded along the bottom collapsing score 11 to place the center partition section 4' in overlying and adhesively secured relation to the center partition section 4, with the end panel section 5' overlying but unsecured to the end panel section 5. The carton body will then be fully assembled in collapsed form and will appear as shown in Fig. 17. The collapsed carton body can then be erected by pressing a bottom collapsing score 11 against a flat surface so that the body will initially expand as indicated in Fig. 18 until fully expanded and erected as shown in Figs. 19 and 21. The paired hook portions 28 and 28' formed in the lower edge of the paired center partition sections 4 and 4' can then be engaged with the notch 29 formed in the adjacent end of the bottom panel as shown in Fig. 21 to maintain the carton body in fully expanded and erected condition.

The associated handle forming part B, recovered from material between the wings w and w' of the body blank, is cut and scored simultaneously with the cutting and scoring of the body blank to provide a pair of handle forming sections 50 and 50' which are hingedly connected along a transverse score 51 as shown in Figs. 14 and 20. The handle sections 50 and 50' are also provided with hand hole cutouts 54 and 54'. The hand hole openings 54 and 54' are so cut as to recover edge rounding flaps 58 and 58' which may be rebent upwardly when the handle part is secured to the erected carton body as shown in Fig. 22 to thereby provide a comfortable hand grip. The handle sections 50 and 50' are each provided with an open ended slot 55 and 55' which define a pair of spaced end legs 57 and 57'. The end legs 57 and 57' are designed to straddle the cross partition strap sections 8 and 8' and overlie the adjacent faces of the center partition sections 4 and 4' when the carrier is fully assembled as shown in Fig. 22.

In applying the handle forming blank B to the assembled carton body, a coating e of adhesive is applied to the inside face of the handle part, and the handle sections 50 and 50' are then bent along the medial score 51 in the manner shown in Fig. 20. The handle part is then telescoped over the composite center partition of the carton body with the end legs 57 straddling the cross partition strap 8 and also adhesively secured to the adjacent face of the center partition section 4. Similarly, the end leg 57' of the handle part straddles the cross partition strap section 8' and is secured to the adjacent face of the center partition section 4'. The handle part B may be machine secured to the center partition of the carton body either while the carton body is only partly expanded as indicated in Fig. 18 or when fully expanded as indicated in Fig. 21.

The four cell carrier as shown in Fig. 22 provides a strong and sturdy bottle carrier which may thereafter be readily collapsed in flat form for shipment or storage by releasing the hook portions 28 and 28' from engagement with the notch 29 in the bottom panel, thereby permitting the carrier to collapse in the manner indicated in Fig. 22a. This carrier may also be readily erected by pressing the bottom collapsing score 11 against a flat surface and fitting the hook portions 28 and 28' into the notch 29 at the adjacent end of the bottom panel. A highly serviceable twin compartment carrier for four bottles is thus provided.

Figure 23:
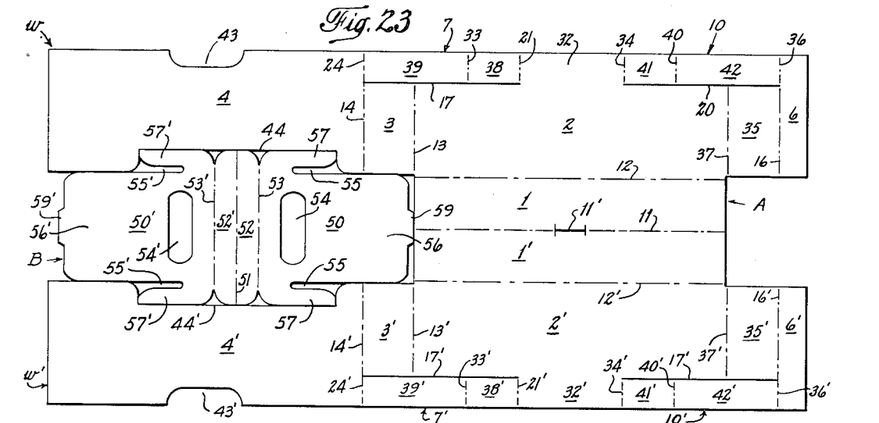
Fig. 23 is an inside face view of a further modified carton forming blank and associated handle forming blank as the same would appear when cut and scored from a paperboard or fiberboard stock sheet.
Figure 31:
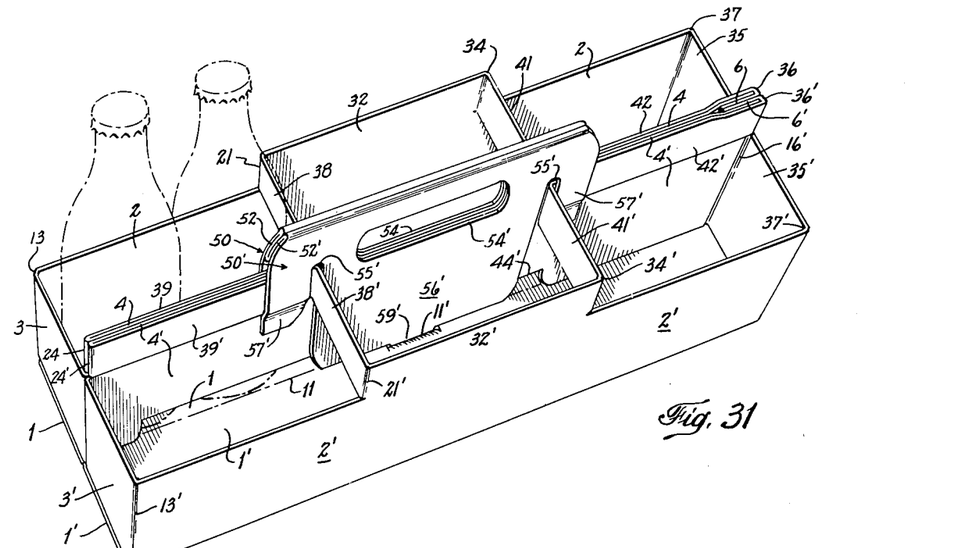
Fig. 31 is a perspective view of this bottle carrier as fully assembled and constructed to receive twelve bottles in the cells thereof.

The carton forming blank A and its associated handle forming blank B as shown in Fig. 23 are designed when assembled to provide a twin compartmented collapsible carrier adapted to contain a total of twelve bottles as shown in Fig. 31. The body blank A and handle blank B consume a substantially rectangular section of sheet material with little resulting waste, and may be cut and scored simultaneously in a single pass through a cutting and scoring machine. The body blank A as shown in Figs. 1 and 2 has a bottom panel which may be sized to hold twelve bottles and comprises bottom half sections 1 and 1' hingedly connected along a longitudinally extending collapsible score 11. The side panels 2 and 2' are hingedly connected to the opposite side edges of the bottom sections 1 and 1' along parallel extending scores 12 and 12' which are also parallel to the bottom collapsing score 11. Wings w and w' extend from adjacent side edges of the side panels 2 and 2' to provide a carton forming blank which is generally U-shaped in configuration.

The wings w and w' of the body blank are scored to form a pair of end wall panel sections 3 and 3' foldably connected along folding scores 13 and 13' to the adjacent side edges of the side panels 2 and 2' respectively. A pair of center partition sections 4 and 4' are foldably connected along score lines 14 and 14' to the respective end panels 3 and 3'. A pair of end wall panel sections 35 and 35' are foldably connected along score lines 37 and 37' to the opposite side edges of the side panels 2 and 2'. A pair of glue flap sections 6 and 6' are foldably connected along score lines 16 and 16' to the adjacent side edges of the end panel sections 35 and 35'. Where a twelve bottle carrier is to be formed, the side wall panels 2 and 2' and the center partition sections 4 and 4' each has a length which approximately corresponds to the diameter of six bottles, so that the carton formed from this blank will provide a twin compartment carrier designed to contain in each compartment six bottles.

Figure 24:
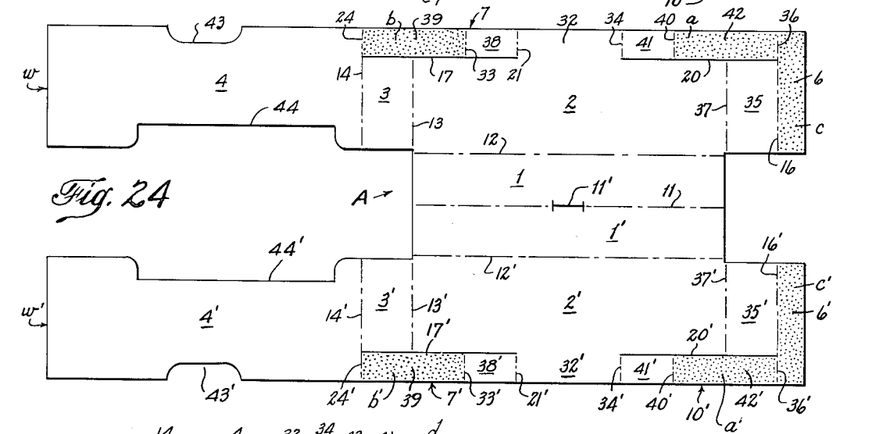
Fig. 24 is an inside face view of a carton forming blank shown in Fig. 23 after adhesive has been applied to certain parts thereof.

A pair of strap forming parts 7 and 7' are separated from the side panels 2 and 2' and the adjacent end panel sections 3 and 3' by a pair of longitudinally extending cuts 17 and 17'. The strap forming parts 7 and 7' as shown in Figs. 23 and 24 are foldably connected at one end thereof by a transverse score 21 and 21' to raised extensions 32 and 32' of the side panels 2 and 2'. The other ends of the strap parts 7 and 7' are foldably connected to the upper part of the adjacent center partition sections 4 and 4' along hinging scores 24 and 24' forming continuations of the end panel defining scores 14 and 14'. The strap forming parts 7 and 7' are also traversed by folding scores 33 and 33' so as to divide the strap parts 7 and 7' into cross partition strap sections 38 and 38' and spanner sections 39 and 39'. In forming a twelve cell bottle carrier, the cross partition strap sections 38 and 38' have a length which corresponds to the diameter of the bottle to be packaged in the formed carrier, and the spanner sections 39 and 39' would then have a length which would approximately correspond to twice the bottle diameter.

A second pair of strap forming parts 10 and 10' are separated from the side panels 2 and 2' and the adjacent end panel sections 35 and 35' by a pair of longitudinally extending cuts 20 and 20'. The strap forming parts 10 and 10' as shown in Figs. 23 and 24 are foldably connected at one end thereof by transverse scores 34 and 34' to the raised side wall extensions 32 and 32'. The other end of the strap parts 10 and 10' is foldably connected to the upper part of the adjacent securing flaps 6 and 6' along hinging scores 36 and 36' forming continuations of the securing flap hinging scores 16 and 16'. The strap forming parts 10 and 10' are also traversed by folding scores 40 and 40' which divide the strap parts 10 and 10' into cross partition sections 41 and 41' and spanner sections 42 and 42'. Where a twelve bottle carrier is to be formed, the folding scores 40 and 40' are placed so that the cross partition strap sections 41 and 41' have a length which approximately corresponds to the diameter of the bottles to be placed in the assembled carrier, thereby making the length of the spanner sections 42 and 42' approximately twice the bottle diameter. The raised extensions 32 and 32' extending from the side wall panels 2 and 2' would then also have a length approximately equal to twice the bottle diameter.

To hold the assembled and erected carton body in fully expanded position, a slot 11' may be formed in the approximate center of the bottom collapsing score 11 to receive paired lock tabs 59 and 59' associated with the handle part whose construction will be presently described. The upper edges of the center partition sections 4 and 4' may have hand cutouts 43 and 43' respectively, and the bottom edges thereof may be recessed as at 44 and 44' to provide material from which the end legs 57 and 57' of the handle forming blank B are captured, as will be described more fully hereafter.

After simultaneous cutting and scoring of the body blank A and associated handle blank B as shown in Fig. 23, the handle blank B drops from between the wings w and w' leaving the body blank in the form shown in Fig. 24, and in condition for gluing and folding into a collapsed body which may be designed to contain twelve bottles. In assembling the carton body, strips a and a' of adhesive are applied to the inside face of the spanner sections 42 and 42', strips b and b' of adhesive are applied to the inside face of the spanner sections 39 and 39', and strips c and c' of adhesive are applied to the inside face of the securing flaps 6 and 6', all of said strips of adhesive being applied in a single spot gluing operation.

Figure 25:
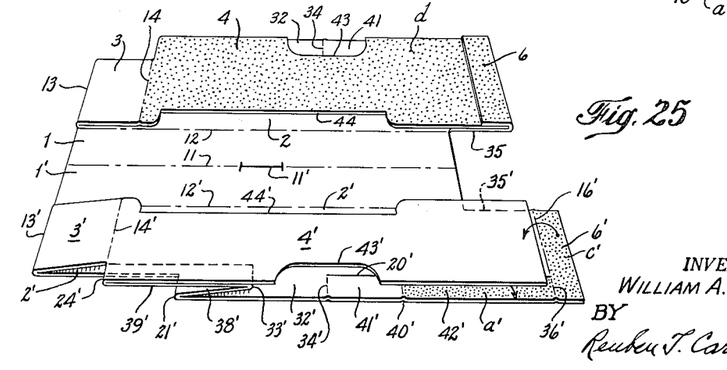
Fig. 25 is a perspective view of the carton forming blank as shown in Fig. 24 as it would appear after the first folding operation and during progress of the second folding operation, adhesive being shown applied to one of the center partition sections thereof in preparation for the third folding operation.

In the first folding operation, the glued body blank as shown in Fig. 24 is folded along the transverse scores 13 and 13' so as to place the end panel sections 3 and 3' in overlying relation to the adjacent side wall panels 2 and 2', and to place the center partition sections 4 and 4' in overlying relation to the adjacent side wall panels 2 and 2' and the adjacent end panel sections 35 and 35' as indicated in Fig. 25. A kicker device associated with the blank gluing and folding machine operates in conjunction with the folding movement of the center partition sections 4 and 4' and end panel sections 3 and 3' to buckle the strap parts 7 and 7' inwardly, as indicated at the bottom of Fig. 25, so that the cross partition strap sections 38 and 38' will overlie the raised side wall extensions 32 and 32', and the associated spanner sections 39 and 39' will become adhesively secured to the overlying center partition sections 4 and 4'. Additionally, as indicated in the lower part of Fig. 25, the spanner sections 42 and 42' will become adhesively secured to the overlying cross partition sections 4 and 4'.

In a following folding operation, the glued securing flaps 6 are folded to overlie the marginal edges of the previously folded center partition sections 4 and 4' as indicated in the upper part of Fig. 25. The partially folded blank is thus run under one or more pressure rollers to insure firm adhesion of the securing flaps 6 and 6' the marginal ends of the cross center partition sections 4 and 4', and to additionally insure firm adhesion of the spanner sections 42 and 42' and spanner sections 39 and 39' to the overlying center partition sections 4 and 4'.

Figure 26:
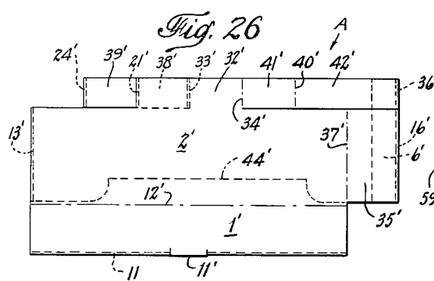
Fig. 26 is a plan view of the assembled carton body in collapsed form as produced from the execution of the third folding operation on the partially folded blank as shown in Fig. 25.
Figure 27:
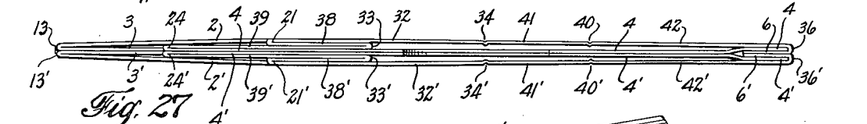
Fig. 27 is a cross section taken longitudinally of the collapsed carton body as it would appear when viewed along line 27—27 of Fig. 26.

In the next operation, a coating of adhesive d is applied to the upper face of center partition section 4 and the overlying securing flap 6 as indicated in Fig. 25. Thereupon, the partly folded blank as shown in Fig. 25 is folded along its bottom collapsing score 11 so as to place the end panel section 3' in overlying but unglued relation to the end panel section 3, to place the center partition section 4' in overlying and in glued relation to the center partition section 4, and to place the securing flap 6' in overlying and in glued relation to the securing flap 6. This carrier will then be fully assembled in collapsed form and will appear as illustrated in Figs. 26 and 27. The collapsed carton body can then be erected by pressing the bottom collapsing score 11 against a flat surface which will cause the body to automatically expand into fully erected position as shown in Fig. 30.

Figure 28:
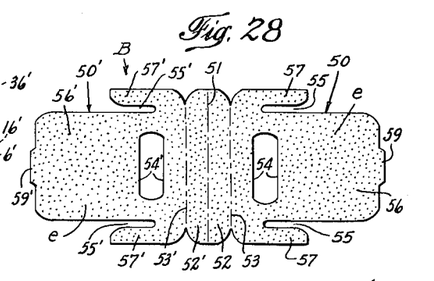
Fig. 28 is a plan view of the associated handle forming blank as it would appear after a coating of adhesive has been applied to the inside face thereof.

The associated handle part B, recovered from material between the wings w and w' of the body blank, is formed to provide a pair of handle forming sections 50 and 50' which are hingedly connected along the transverse score 51 as shown in Figs. 23 and 28. To thicken and strengthen the hand grip of the handle part, the handle sections 50 and 50' may incorporate rebent portions 52 and 52' which are defined by parallel transverse scores 53 and 53'. The handle sections 50 and 50' are also provided with hand hole cutouts 54 and 54', and each is provided with a relatively wide center leg 56 and 56' respectively which has sufficient length to extend down to the flattened bottom panel of the erected body. The terminal ends of each of the center legs 56 and 56' may be provided with a lock tab 59 and 59' designed to be inserted into the conforming slot 11' in the erected bottom panel when the carton is fully assembled. Each of the handle sections 50 and 50' is also provided with a pair of spaced end legs 57 and 57' which may be substantially shorter than the adjacent center leg 56 so that the end legs may be captured from the material removed at the bottom recesses 44 and 44' in the center partition sections 4 and 4' of the body blank as indicated in Fig. 23. The paired end legs 57 are separated from the wider and longer center leg 56 by open ended slots 55, and the paired end legs 57' are likewise separated from the wider and longer center leg 56' by open ended slots 55'.

In applying the handle blank B made in the form shown in Figs. 23 and 28, to its associated carton body, a coating e of adhesive is applied to the inside face of the handle part as shown in Fig. 28. The rebent portions 52 and 52' of the handle sections 50 and 50' are then folded along the medial score 51 with the glued faces outermost. The handle sections 50 and 50' are then reverse folded along the parallel scores 53 and 53' so that the glued face of the rebent portion 52 will be secured to the glued face of its associated handle section 50, and the glued face of the rebent portion 52' will be secured to the glued face of its associated handle section 50'.

Figures 29, 30:
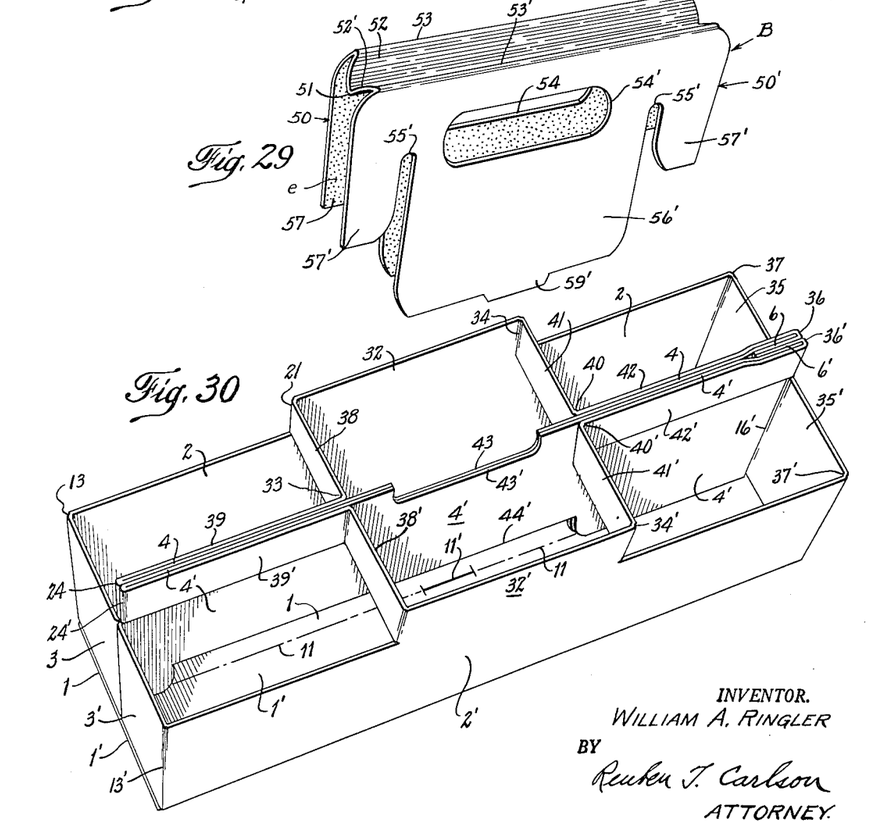
Fig. 29 is a perspective view of the handle forming blank shown in Fig. 28 partly folded and shaped for application to the expanded carton body.
Fig. 30 is a perspective view of the expanded and erected carton body ready to receive the handle section shown in Fig. 29.

The handle part formed as shown in Fig. 29 is then telescoped over the composite center partition of the carton body with the center leg 56 positioned between cross partition straps 38 and 41 and secured to the adjacent face of the cross partition section 4 and with the end legs 57 exterior to the cross partition strap sections 38 and 41 and also secured to the adjacent face of the center partition section 4. Similarly, the center leg 56' of the handle part is inserted between the cross strap sections 38' and 41' and secured to the adjacent face of the center partition section 4', with the end legs 57' of the handle part exterior to the cross strap sections 38' and 41' and also secured to the adjacent face of the center partition section 4'. The handle part B may thus be applied and secured to the composite center partition of the carton body by machine operation, either while the carton body is only partly expanded or when fully expanded.

Figure 32:
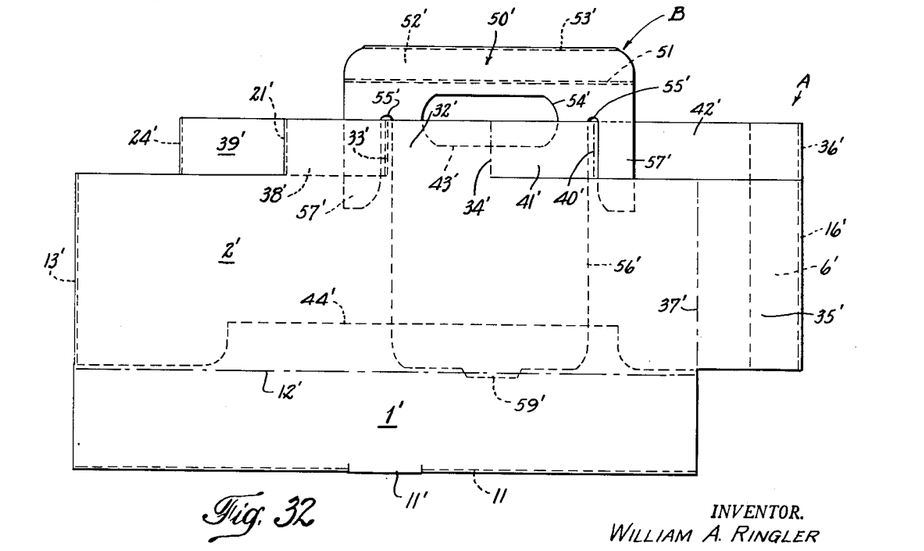
Fig. 32 is a face view of this bottle carrier as it appears when fully collapsed for shipment or storage.

To maintain the carton body in erect position, the paired lock tabs 59 and 59' associated with the handle part may be inserted into the conforming slot 11' in the bottom panel of the carton body. The fully assembled carrier as shown in Fig. 31 may be readily collapsed by exerting an upward pull on the handle part to retract the lock tabs 59 and 59' thereof from the slot 11' in the bottom panel, whereupon the carrier may be fully collapsed into flat form for shipment and storage as shown in Fig. 32.

While the twelve bottle carrier as shown in Fig. 31 has only six cells designed to contain two bottles in each cell, each cell may be separated into two individual bottle receiving cells by the provision of additional cross straps extending between the side panels 2 and 2' and the composite center partition.

By following the above disclosure, it is evident that strong and sturdy twin compartment bottle carriers may be constructed to contain any desired number of bottles. Various means may also be employed to maintain the carrier body in erect position, as by the provision of paired lock tabs 27 and 27' extending from the lower edges of the cross partition sections 4 and 4' and insertable into a slot 11' in the bottom panel as indicated in Figs. 2 and 19, or paired lock tabs 59 and 59' may be associated with the handle part and insertable into the conformed slot 11' in the bottom panel as indicated in Figs. 24 and 31, or alternatively, hook portions 28 and 28' may be formed in the lower edges of the center partition sections 4 and 4' to interlock with a notch 29 formed in the adjacent end of the bottom panel as indicated in Figs. 14 and 21.

Carriers can be made in accordance with this invention with a minimum of paperboard material since the handle part is recovered from material which is otherwise discarded as waste between the wings w and w' of the body blank. The paired body and handle blanks may be cut and scored simultaneously at high production speeds, and the body blanks thereafter glued and assembled in collapsed form by relatively few gluing and folding operations which can be mechanically performed at high speed on a gluing and folding machine of substantially standard construction. The handle part is designed to be glued, folded and applied to the composite center partition of the body part by an automatic machine having devices associated therewith for performing these operations at high speed. These carriers can thus be manufactured at low cost to provide a strong and sturdy bottle carrier having any desired number of bottle receiving cells, and which will withstand great abuse and give long service. Carriers constructed in accordance with this invention are symmetrical in appearance and can be made in numerous patterns and forms. These carriers are made to provide flat surfaces of substantial area for advertising purposes with the finished and decorated side of the blank forming the outer surfaces of the erected carriers so that only one side thereof need be printed and decorated.

While certain novel features of this invention have been disclosed herein and are pointed out in the claims, it will be understood that various omissions, substitutions and changes may be made by those skilled in the art without departing from the spirit of this invention.

What is claimed is:

1. A body blank assembly and a companion handle blank cut from the same stock sheet and designed for assembly into a multi-celled collapsible bottle carrier, said body blank presenting a bottom panel, a pair of side panels foldably connected to opposite side edges of said bottom panel, and a pair of spaced substantially parallel wing extensions projecting laterally from adjacent side edges of said side panels, each of said wing extensions including an end panel section foldably connected to the side edge of the adjacent side panel, and a center partition section integrally hinged at one end thereof to the adjacent end panel section and having an overall length approximately equal to the overall length of the adjacent side panel, a partition forming strap associated with each of said side panels and the adjacent end panel section and being integrally hinged along generally transversely extending fold lines at one end thereof to the upper portion of the adjacent center partition section and at the other end thereof to a raised extension of the adjacent side panel, each of said partition forming straps being otherwise separated from its associated side panel and end panel section by a generally longitudinally extending cut, said handle blank being captured from sheet stock material between said spaced wing extensions and having an overall length substantially equal to the length of the wing extensions, said handle blank comprising a pair of substantially similar handle sections foldably connected along a transverse score, each of said handle sections having a hand hole therein and body attaching legs extending substantially parallel to said wing extensions.

2. A body blank assembly and a companion handle blank cut from the same stock sheet and designed for assembly into a multi-celled collapsible bottle carrier, said body blank presenting a bottom panel, a pair of side panels foldably connected to opposite side edges of said bottom panel, and a pair of spaced and substantially parallel wing extensions projecting laterally from adjacent side edges of said side panels, each of said wing extensions including an end panel section foldably connected to the side edge of the adjacent side panel, a center partition section integrally hinged at one end thereof to the adjacent end panel section and having an overall length approximately equal to the overall length of the adjacent side panel, and a second end panel section integrally hinged to the opposite end of the center partition section, a partition forming strap associated with each of said side panels and the adjacent end panel section and being integrally hinged along generally transversely extending fold lines at one end thereof to the upper portion of the adjacent center partition section and at the other end thereof to a raised extension of the adjacent side panel, each of said partition forming straps being otherwise separated from its associated side panel and end panel section by a generally longitudinally extending cut, said handle blank being captured from sheet stock material between said spaced wing extensions and having an overall length substantially equal to the length of the wing extensions, said handle blank comprising a pair of substantially similar handle sections foldably connected along transverse scores by rebent portions, each of said handle sections having a hand hole therein and body attaching legs extending substantially parallel to said wing extensions.

3. A body blank assembly and a companion handle blank cut from the same stock sheet and designed for assembly into a multi-celled collapsible bottle carrier, said body blank presenting foldably connected bottom panel sections, a pair of side panels foldably connected to opposite side edges of said bottom panel sections, a pair of end panel sections foldably connected to adjacent side edges of said side panels, and a pair of spaced and substantially parallel wing extensions projecting laterally from the other side edges of said side panels, each of said wing extensions including an end panel section foldably connected to the side edge of the adjacent side panel, and a center partition section foldably connected to the adjacent end panel section and having an overall length approximately equal to the overall length of the adjacent side panel, a pair of partition forming straps associated with each of said side panels and the adjacent end panel sections and being integrally hinged along generally transversely extending fold lines at one end thereof to the most removed side edge of the adjacent end panel section and at the other end thereof to a raised extension of the adjacent side panel, a second pair of partition forming straps each integrally hinged at one end thereof to the raised extension of the adjacent side panel and having a free tab portion at the other end thereof each of said partition forming straps being otherwise separated from its associated side panel and end panel section by a generally longitudinally extending cut, said handle blank being captured from sheet stock material between said spaced wing extensions and having an overall length substantially equal to the length of the wing extensions, said handle blank comprising a pair of substantially similar handle sections foldably connected by rebent portions defined by transversely extending scores, each of said handle sections having a hand hole therein and spaced slots extending substantially parallel to said wing extensions and defining body attaching legs therefor.

References Cited in the file of this patent

UNITED STATES PATENTS

| | | | |
|---|---|---|---|
| 1,157,712 | Miller | Oct. 26, | 1915 |
| 2,216,299 | Schilling | Oct. 1, | 1940 |
| 2,409,673 | Glascoff | Oct. 22, | 1946 |
| 2,418,350 | Holy | Apr. 1, | 1947 |
| 2,445,202 | Belanger | July 13, | 1948 |
| 2,532,446 | Hall | Dec. 5, | 1950 |
| 2,537,615 | Arneson | Jan. 9, | 1951 |
| 2,593,135 | Gilbert | Apr. 15, | 1952 |
| 2,598,920 | Keith | June 3, | 1952 |
| 2,606,712 | Kowal | Aug. 12, | 1952 |
| 2,652,968 | Bolding | Sept. 22, | 1953 |